(No Model.) 5 Sheets—Sheet 1.
W. W. ROSENFIELD.
APPARATUS FOR DETECTING LEAKS IN PIPES.
No. 429,286. Patented June 3, 1890.
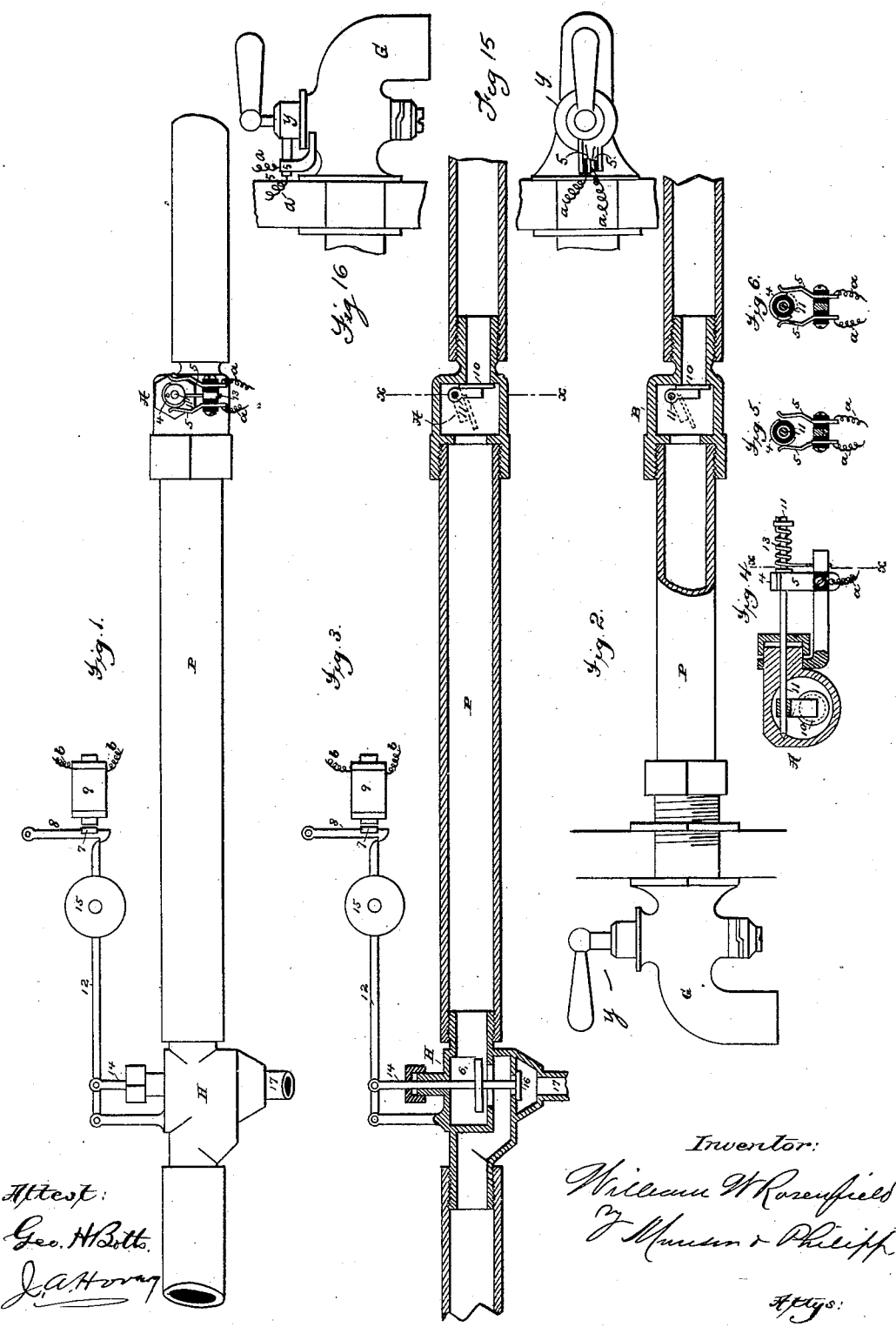
Attest:
Geo. H. Bott.
J. A. Horan
Inventor:
William W. Rosenfield
by Munson & Philipp
Attys.

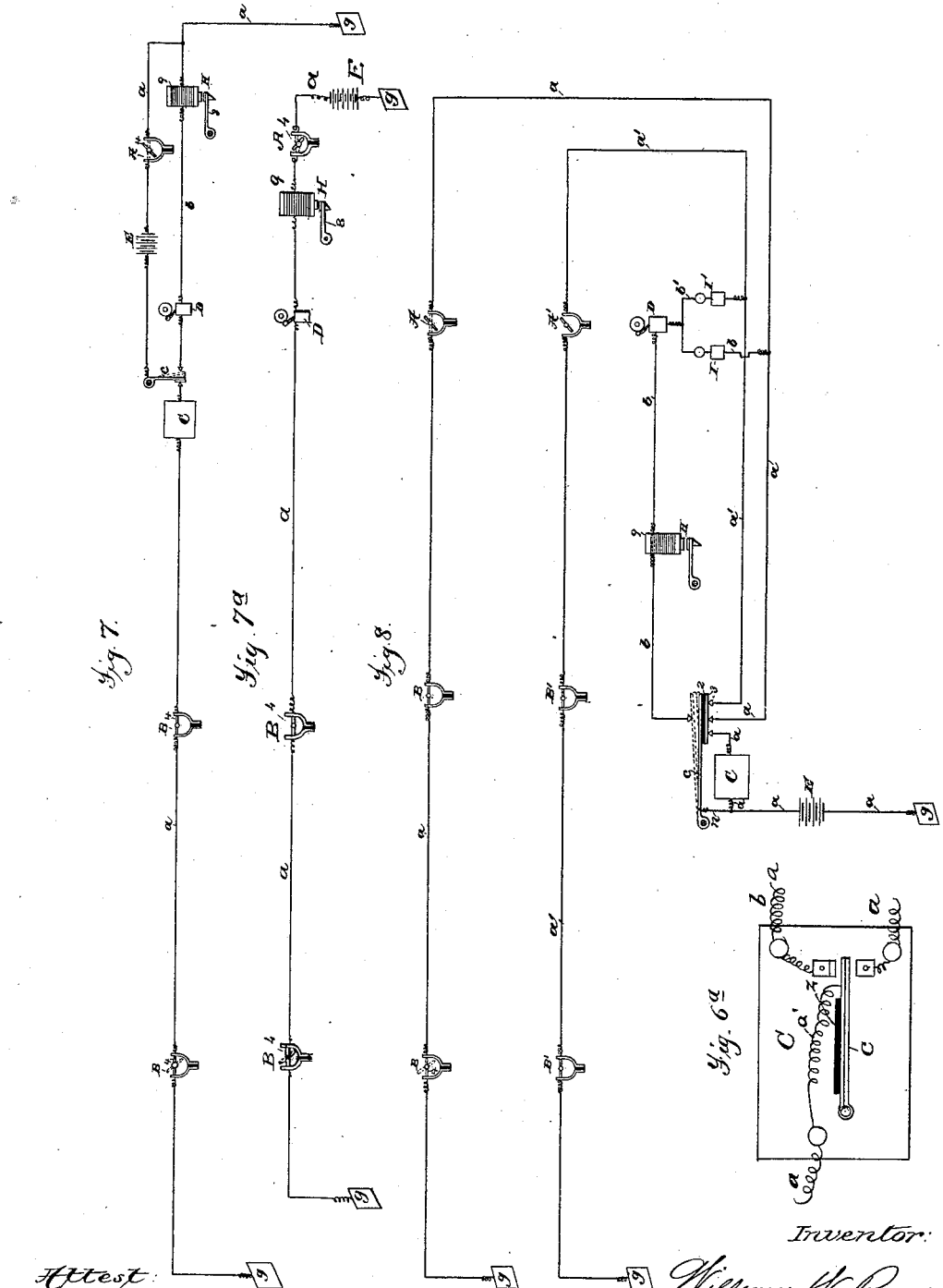

(No Model.) 5 Sheets—Sheet 3.
W. W. ROSENFIELD.
APPARATUS FOR DETECTING LEAKS IN PIPES.
No. 429,286. Patented June 3, 1890.
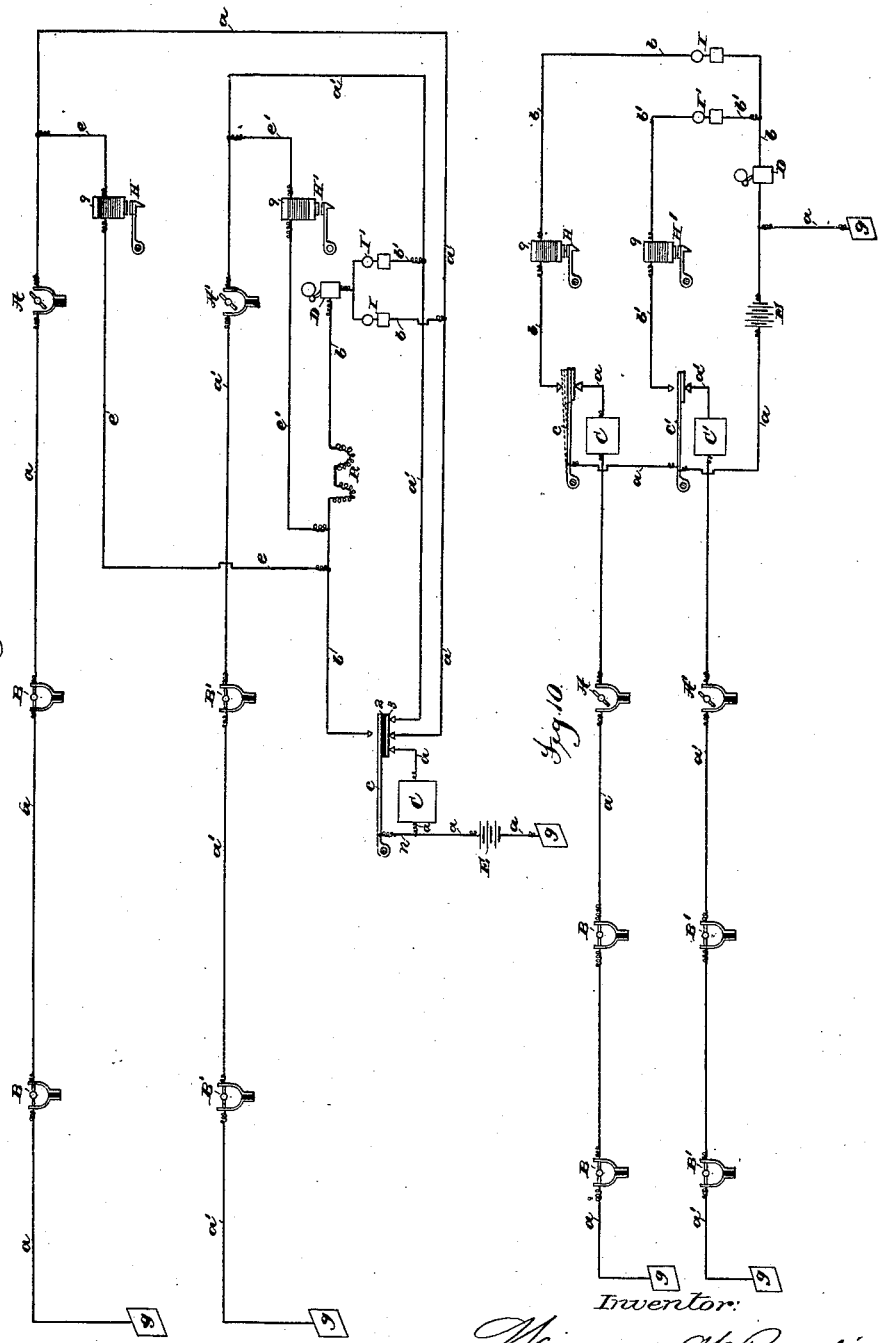

(No Model.) 5 Sheets—Sheet 4.
W. W. ROSENFIELD.
APPARATUS FOR DETECTING LEAKS IN PIPES.
No. 429,286. Patented June 3, 1890.
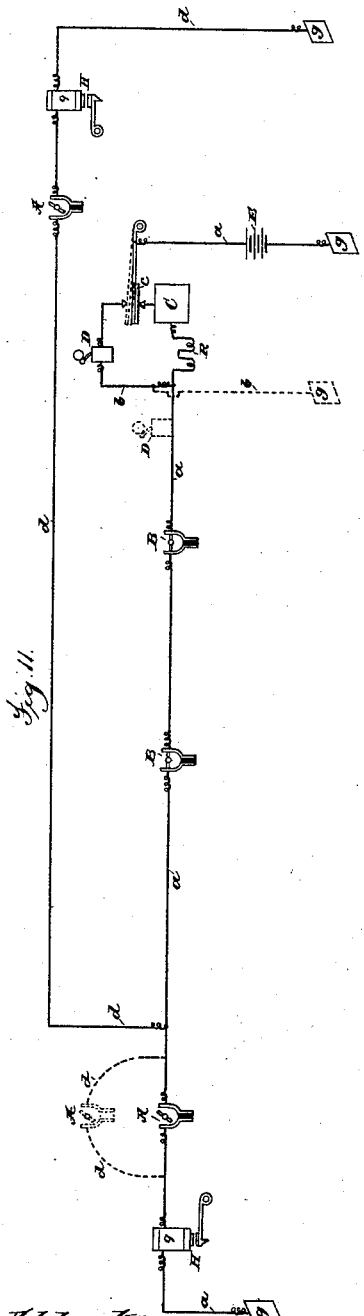
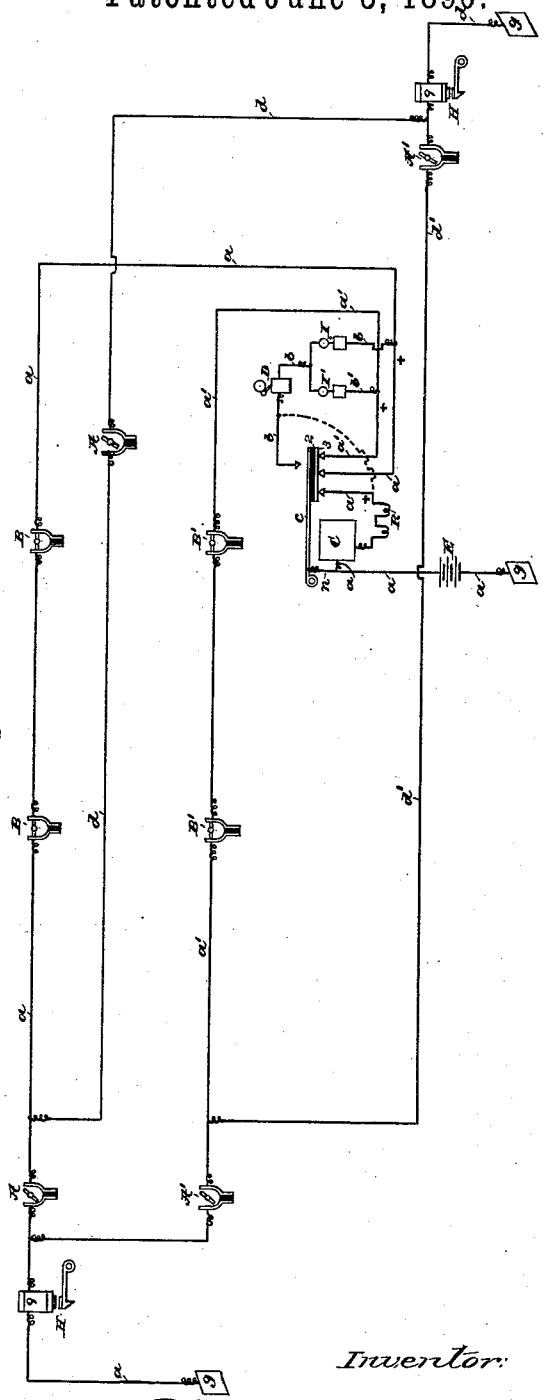
Attest:
Geo. H. Potts.
J. A. Hovey
Inventor:
William W. Rosenfield
by Munson & Phipps
Attys.

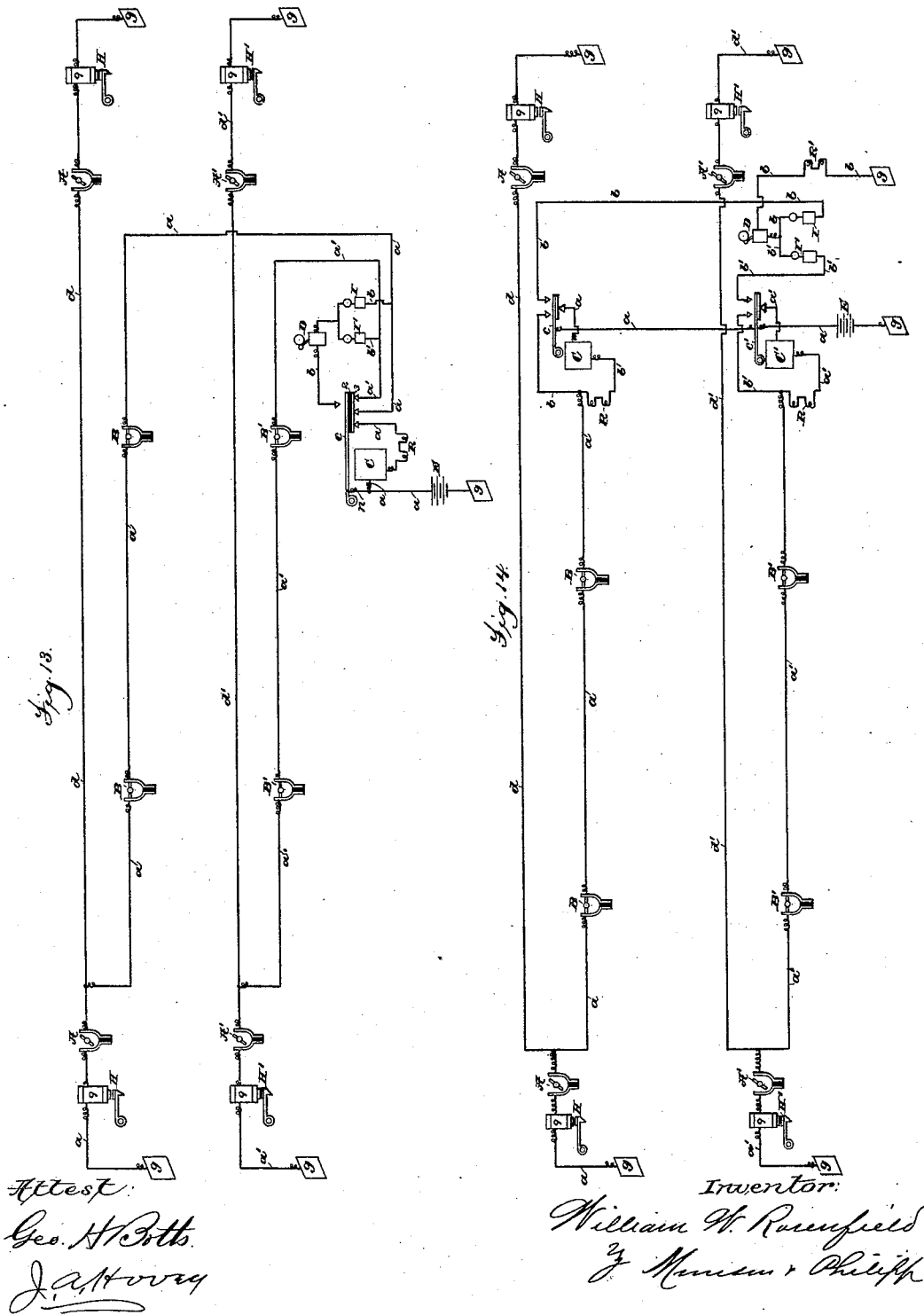

UNITED STATES PATENT OFFICE.

WILLIAM WOODWARD ROSENFIELD, OF BROOKLYN, ASSIGNOR TO ANTHONY ROSENFIELD, OF NEW YORK, N. Y.

APPARATUS FOR DETECTING LEAKS IN PIPES.

SPECIFICATION forming part of Letters Patent No. 429,286, dated June 3, 1890.

Application filed September 4, 1886. Serial No. 212,686. (No model.)

*To all whom it may concern:*

Be it known that I, WILLIAM WOODWARD ROSENFIELD, a citizen of the United States, residing at Brooklyn, county of Kings, and State of New York, have invented certain new and useful Improvements in Apparatus for Detecting Leaks in Pipes, fully described and represented in the following specification and the accompanying drawings, forming a part of the same.

This invention relates to an apparatus for detecting the flow of a liquid or fluid through a pipe or conduit, it being the object of the invention to provide an apparatus by which any flow of a liquid or fluid in a pipe, occasioned by a leak in the pipe or by the improper withdrawal of the liquid or fluid from the pipe, may be detected and notice of the fact given either by sounding an alarm, operating an indicator, or in any other suitable manner.

The apparatus embodying my invention may be employed for detecting leakage in pipes or conduits which are used for conducting any liquid or fluid; but for convenience the term "water" will be hereinafter used in referring to the pipe or conduits and its contents, and this term is to be understood as embracing any liquid or fluid.

In order that the detailed description of the organization and operation of the apparatus embodying the invention, which will be hereinafter given, may be more readily understood, a brief general description of the organization of the apparatus will be first given.

The apparatus in its simplest form consists of a translating device, by which is meant any device which may be operated or caused to operate by an electric current to give notice of the existence of a leak—as, for example, an alarm or indicator mechanism, or a mechanism which operates a valve to cut off the supply of water—a circuit-controller, for convenience termed a "primary controller," which is located in the water-pipe and operated by the water when in motion; electrical connections whereby the operation of the primary controller operates the translating device; one or more circuit-controllers, for convenience termed "secondary controllers," which are constructed to be operated when water is drawn for use, and electrical connections whereby the operation of the secondary controller, or of one or more of them when a plurality are employed, prevents the operation of the translating device. The primary controller is located in the water-pipe at a point distant from its exit or exits and near the source of supply to the building or district to which the apparatus is applied, and is so constructed that when in its normal position—that is to say, the position which it takes when the water is not moving in the pipe—it will maintain the circuit in such condition that the translating device will be prevented from operating. One of the secondary controllers is located at a point adjacent to each of the faucets or other exits from which water is drawn for use, and is so constructed that when in its normal position—that is to say, the position which it takes when water is not being drawn—it will maintain the electrical connections in such condition as to permit the translating device to operate. The primary controller is so constructed that as soon as any water commences to flow past it in the pipe it will be operated to change the condition of the circuit, so as to cause the translating device to operate, while the secondary controller or controllers is or are so constructed that whenever any water is drawn from the pipe at any point in the regular way they will change the condition of the circuit so as to neutralize the effect of the primary controller and prevent the translating device from operating. From this it will be seen that when water is drawn from the pipe at any point or points provided for that purpose, as through a faucet or other exit, so as to set the water in motion, the primary controller will be at once operated to put the circuit in condition to operate the translating device; but at the same time the secondary controller adjacent to the exit at which water is being drawn will act reversely and put the circuit in condition to prevent the translating device from operating, and thus the drawing of water in the regular way will not operate the translating device so as to give an alarm or shut off the water. If, however, the pipe should leak or burst or be tampered with at a point between the primary controller and either one of the secondary controllers, the water would be caused to flow past the primary controller and so operate it and put the circuit in condition to operate the translating device; but in such case the secondary controller would not be operated, and consequently the translating device would be permitted to operate and notice of the leak would be given. Under some circumstances it might happen that when water was drawn from the pipe in the regular way the primary controller would be operated to put the circuit in condition to operate the translating device slightly in advance of the time when the secondary controller would be operated to prevent the operation of the translating device, and thus the translating device might be operated so as to give notice of a leak when in reality there was no occasion for so doing. This, however, can readily be avoided by providing the electrical connections with an automatic cut-out apparatus, which will prevent the translating device from being operated until a certain length of time has elapsed after the primary controller has been operated to put the circuit in condition to operate the translating device, and the cut-out apparatus can readily be so adjusted that in no event will the translating device be operated until sufficient time will have elapsed to allow the secondary controller to operate to neutralize the effect of the primary controller.

The system thus outlined embodies the invention in its simplest form. It is to be remarked, however, that the invention may readily be so modified by dividing the system into districts that the location of a leak may be indicated either exactly or approximately, or that the water may be cut off from a portion of the system without cutting it off from the whole. The apparatus can also be so modified without departing from the invention as to be applied to those cases where the system of water-pipes is supplied from two or more sources—as, for example, from a tank and a street-main. Where the system is supplied from two or more sources, there will of course be a corresponding number of the primary controllers, and the electrical connections will be so arranged that each primary controller will act to operate the translating device.

The system thus briefly outlined will now be described in detail, reference being had to the accompanying drawings, which show an organized apparatus embodying the invention, and in which—

Figure 1 is a side view of a portion of a water-supply pipe, showing the primary controller and also the cut-off valve and the apparatus for automatically operating it. Fig. 2 is a similar view, partly in section, of the portion of the pipe containing one of the faucets for drawing water and the secondary controller located adjacent thereto. Fig. 3 is a sectional view of the portion of the pipe shown in Fig. 1. Fig. 4 is a cross-section taken upon the line $x\,x$ of Fig. 3. Fig. 5 is a section taken on the line $x\,x$ of Fig. 4. Fig. 6 is a similar view showing the circuit closing and breaking device in position to close the circuit. Fig. 6$^a$ is a view illustrating a form of automatic cut-out apparatus that may be employed. Figs. 7 to 14, inclusive, are diagrams illustrating the electrical connections and the operation of the apparatus. Figs. 15 and 16 show a modified form of the secondary controller.

Referring now particularly to Figs. 1 to 6, it is to be understood that P represents that portion of a water-pipe through which all the water for supplying a building, a certain part of a building, or a number of buildings passes. This pipe is provided at a suitable point with a primary controller A. This controller consists of a plain disk 10, of metal or leather, which is seated against a shoulder formed in the pipe, and is attached to a rod 11, which passes through the side of the pipe and is packed by a suitable stuffing-box, which forms a tight joint between the rod and pipe. The rod 11 is provided with a light spring 13, the tendency of which is to hold the disk 10 to its seat with a gentle pressure, as shown. The rod 11 is also provided with a metal contact-piece 4, which is insulated from the rod, and is so arranged that as the rod is rocked it makes and breaks connections between a pair of light spring-arms 5, which are insulated from each other and from the pipe and are connected with the ends of an electrical conductor $a$, which forms the electrical circuit in which the controller is located. The term "wire" will for convenience be hereinafter used in referring to the electrical conductors forming the various circuits. The contact-piece 4 is so arranged that when the disk 10 is in its normal position, as shown in Figs. 3 and 4, no connection will be made between the arms 5, as shown in Figs. 1 and 5, and as a consequence the circuit in which the controller is located will be broken, while, on the other hand, when the disk 10 is moved away from its seat to the position indicated by dotted lines in Fig. 3 the rod 11 will be rocked so as to bring the contact-piece 4 into position to make the connection between the arms 5, as shown in Fig. 6, and thus the circuit in which the controller is located will be closed. The cut-off valve H is located at any convenient point in the pipe P, preferably just inside the primary controller A, and, as illustrated in the present case, consists of a disk valve 6, which is arranged to close the opening in the pipe, so as to prevent the passage of the water inward through the pipe. This disk is provided with a stem or rod 14, which passes through a stuffing-box in the side of the pipe, and is connected to a lever 12, provided with a weight 15, which is so arranged that when the lever is released the weight will operate to close the valve and cut off the passage of water through the pipe. The lever 12 is normally held in position to keep the valve 6 open by means of a pivoted hook 8, to which is secured the armature 7 of an electric magnet 9, which is located in the electrical circuit, so as to be energized whenever the circuit is closed to give the alarm, as has been hereinbefore explained. The valve-stem 14, as shown in the present case, is also provided with a second disk valve 16, which controls a small waste-passage in the side of the pipe which communicates with the waste-pipe 17. This valve 16 is so arranged that when the lever 12 is held in its raised position, so as to keep the valve 6 open, the valve 16 will be closed, so as to prevent the escape of the water. When, however, the lever 12 is released, so as to close the valve 6, the valve 16 will be opened, and any water in the pipe inside the valve 6 will at once be drained out through the waste-pipe 17.

Referring now particularly to Fig. 2, it is to be understood that G represents an ordinary faucet located at the end of the pipe P or of any branch leading therefrom or communicating therewith and through which water is to be drawn for consumption. It is of course to be understood that there may be any number of the faucets G located upon branches of the pipe P or upon pipes connected therewith for supplying water to various rooms or parts of a building or any number of buildings. Located near each one of the faucets G is one of the secondary controllers B. These controllers are constructed exactly like the primary controller already described, except that the contact-pieces 4 of these controllers are so placed that when the controller is in its normal position, as shown in Fig. 2, the contact-piece 4 will be in the position shown in Fig. 6—that is to say, in position to make connection between the spring-arms 5, while when the disk of the controller is moved, as indicated by dotted lines in Fig. 2, as will be the case when water is being drawn through the faucet G, the contact-piece 4 will be carried to the position indicated by dotted lines in Fig. 6, thereby breaking the connection between the arms 5 and breaking the circuit through the controllers, as before explained.

Referring now to Fig. 7, the operation of the apparatus in one of its simplest forms will be explained. In this diagram, A represents a primary controller located in the water-pipe at a point through which all the water for supplying a single building, for example, passes, and B B secondary controllers located in close proximity to faucets in different parts of the building. These three controllers are connected, in the manner already explained, by a wire $a$, which is provided with a suitable battery E, and is grounded at its ends, as indicated at $g$, so as to form an electric circuit. C represents an ordinary automatic cut-out apparatus of any of the approved forms, and $c$ the switch of this cut-out apparatus. $b$ represents a branch wire extending from the wire $a$ to a point within the range of the switch $c$. D represents an ordinary electrical alarm mechanism, which is connected to the wire $b$ in the usual manner, and 9 represents the electro-magnet, also connected to the wire $b$, which operates to release the lever 12 and permit the cut-off valve 6 to close. When the parts are in their normal position, the contact-pieces 4 of the controllers B will, as before explained, be in position to close the circuit, and the contact-piece 4 of the controller A will be in position to break the circuit, as indicated in the diagram, while the switch $c$ of the cut-out mechanism will be in position to form the connection through all of the controllers, as also indicated in the diagram.

The automatic cut-out apparatus C may be of any of the ordinary forms. One form suitable for the purpose is illustrated in Fig. 6ª. In this form of cut-out apparatus, which is a common and well-known form, the spring $c$ forms the switch, the spring being arranged so that when in its normal position it completes the circuit through the wire $a$. As soon as the current passes over the wire $a$ and through the small wire $a'$, adjacent to the spring, but insulated therefrom for the greater portion of its length, as indicated by the dark line $z$, the wire $a'$ becomes heated and its heat is transmitted to the spring $c$, which, being made of two metals which expand unequally, changes its position and breaks the circuit through the wire $a$ and closes the circuit through the wires $a\ b$. The spring-switch $c$ can be so adjusted that the current will pass over the wire $a\ a'$ a greater or less length of time before the switch will shift to change the current onto the wire $b$. The wire $a'$ is shown in the figure as somewhat removed from the spring to avoid confusion; but in practice it lies close to the spring. In the various diagrams the switch $c$ is shown as located outside of the apparatus C; but this is only for convenience in illustrating the operation, it not being intended to illustrate the construction of the cut-out apparatus in those figures.

Let it now be assumed that water is being drawn from the faucet located near one of the controllers B. As soon as the faucet is opened the water moving in the pipe will at once operate the controller A, so as to close the circuit at that point, as indicated by dotted lines; but simultaneously with this or immediately after the controller B, located adjacent to the faucet which is opened, will be operated, so as to break the circuit at that point, as before explained, and as indicated by dotted lines, and thus no current will be permitted to pass through the circuit; or if the controller B fails to operate as promptly as the controller A the current may pass through the circuit for a short time, but the time will not be sufficient to operate the switch $c$, and consequently no alarm will be sounded and the cut-off valve will not be operated. As soon as the faucet through which water is being drawn is closed, so that the water ceases to flow through the pipe, the spring 13 of the controller B will operate the controller so as to again close the circuit at that point; but at the same time the spring 13 of the controller A will operate that controller, so as to break the circuit at that point.

Let it now be assumed that a leak occurs in the water-pipe at any point between the primary controller A and either one of the secondary controllers B. The movement of the water past the controller A will at once operate that controller so as to close the circuit at that point, but no water will move past either one of the controllers B, and as a consequence the circuit will not be broken by either of these controllers, but will remain closed. The current will then pass over the wire a and through the cut-out mechanism C, and after the current has passed through the cut-out mechanism for a sufficient length of time—the time depending upon the adjustment of that mechanism—the switch c will be shifted, as indicated by dotted lines, so as to form a circuit through the wire b, and consequently send the current through the alarm D and magnet 9, thereby sounding the alarm and at the same time energizing said magnet, so as to release the lever 12 and permit the valve 6 to close.

It is of course to be understood that the alarm D is located at some convenient point, either in the building or outside of it, where it will be heard by the person to whom it is desired to give warning of the leak.

By means of this system it will be seen that notice can be given at any point of a leak occuring in the pipes of a building, and thus the person in charge can be brought quickly to the spot to prevent the liability of damage. By this means also the further flow of water into the building is stopped, and if the cut-off valve H is provided with the drain-pipe the water in the pipes inside the building is withdrawn.

It will usually be better to employ an automatic cut-out apparatus, as just described; but this will not in all cases be necessary.

Fig. 7ª illustrates an arrangement of the connections when the cut-out apparatus is not employed. In this case the primary controller, the secondary controllers, the alarm, and magnet for operating the cut-off valve are all in the single circuit formed by the wire a, as indicated.

In Fig. 8 an arrangement of the connections is illustrated by which the system is divided into districts, so that in addition to giving notice of the existence of a leak its location will be indicated. Referring to said figure, it is to be understood that A represents a primary controller located in the water-pipe which supplies a given district—for example, a building or a part of a building; B, secondary controllers located in close proximity to the several faucets in that district; A', another primary controller located in the pipe which supplies another district; B', secondary controllers located in close proximity to the faucets in that district, and H a cut-off valve located in the pipe through which both districts are supplied. The controllers A and B are connected by a wire a, which is provided with a battery E, and is grounded at its ends, as indicated at g, so as to form an electrical circuit. The circuit thus formed is provided with an automatic cut-out C, the same as in the case already described. The switch c of the cut-out C is provided with a contact-plate 3, which is insulated from the main part of the switch by an interposed piece 2 of insulating substance, and the plate 3 is so arranged that when the switch c is in its normal position it will form a connection between the two parts of the wire a. The controllers A' B' are connected by a wire a', which is grounded at one end, as indicated at g, and terminates in position to be connected to that portion of the wire a' in which the battery E and cut-out C are located by the plate 3 when the switch c is in its normal position, as shown by full lines. The alarm D and cut-off valve H are connected to the wire a by a branch wire b, which terminates at a point within the range of the switch c, and this branch wire is connected to an ordinary indicator or annunciator I. The wire a' is provided with a branch b', which is connected to an indicator I' and to the branch b at a point between the indicator I and the alarm D. The wire a is provided with a branch n, which is connected to the switch c, or terminates in such position that the switch, when shifted to the position indicated by dotted lines, forms connection between it and the branch wire b. The operation of the apparatus when thus organized is as follows: When water is drawn from the faucet adjacent to any one of the controllers B or B', the controller A or A', as the case may be, will at once be operated so as to close the circuit through the wire a, or a and a', as the case may be; but at the same time or immediately after the secondary controller adjacent to the faucet will be operated so as to break the circuit thus formed, and the alarm will not be given. If, however, a leak occurs at a point between the controller A and either one of the controllers B, the controller A will be operated so as to close the circuit through the wire a, and the controllers B will remain in their normal positions, so as to keep the circuit closed. The current will then pass over the wire a and through the cut-out C, and after it has passed through the cut-out a sufficient length of time the switch c will be shifted to the position shown by dotted lines, thereby forming a circuit through the wires a, b, and n, so as to send the current through the magnet 9, alarm D, and indicator I, and thus cut off the water from the whole system, sound the alarm, and indicate the district in which the leak exists. If, on the other hand, a leak should occur at any point between the controller A′ and either one of the controllers B′, the result would be the same, except that the circuit, instead of being formed through the wire *a*, would be formed through the wires *a′* and *a* to send the current through the cut-out C, and after the switch *c* was shifted the circuit, instead of being formed through the wires *a*, *n*, and *b*, would be formed through the wires *a*, *n*, *b*, *b′*, and *a′*, thereby operating the indicator I′ instead of I, and indicating the fact that the leak existed in the other district.

The organization illustrated in Fig. 9 is exactly the same as that last described, except that provision is made by which, when a leak occurs in either district, the water instead of being cut off from the whole system is cut off from only that district. For this purpose, instead of providing a single cut-off valve located in the pipe through which the whole system is supplied, the pipe through which each district is supplied is provided with a cut-off valve, and the electrical connections are so arranged that when a leak occurs in any district the cut-off valve for only that district is operated. In the diagrams H and and H′ represent cut-off valves located in the pipes through which the respective districts are supplied, and the magnets 9 which operate these valves are provided with wires *e e′*, by which they are connected with the wire *b* and the wires *a* and *a′*, respectively. The operation of the apparatus when thus organized is the same as just described in connection with Fig. 8, except that when the switch *c* is shifted so as to close the circuit through the wires *a n b* or *a n b b′ a′*, as the case may be, a circuit will also be formed through the wires *a n b e* or *a n b′ e′ a′*, as the case may be. Let it be assumed, therefore, that the controller A has been operated so as to close the circuit at that point and the switch *c* shifted so as to form a circuit through the wires *a n b* and *a n b e*. The current will then pass through the alarm D and indicator I, so as to give the alarm and indicate the district in which the leak exists, and at the same time the current will pass through the magnet 9 of the cut-off valve H, so as to operate the valve and cut off the water from that district. The valve H′ will not, however, be operated. If the controller A′ is operated, the result will be the same, except that the indicator I′ and the cut-off valve H′ will be operated.

It will usually happen that the resistance offered by the magnets of the alarm and indicator will be much less than that offered by the magnet 9 of the cut-off valve, and it will therefore usually be necessary in the organization just described to provide the wire *b* with a sufficient resistance-coil, as indicated at R, to prevent too great a portion of the current from passing through the alarm and indicator.

The organization illustrated in Fig. 10 accomplishes the same results as that last described; but in this case each of the districts is provided with a cut-out apparatus, and the connections are so arranged that the controllers are not in the circuit with the alarm, indicator, and cut-off mechanisms. The operation of the apparatus when thus organized is as follows: If a leak occurs between the controller A and either one of the controllers B, the controller A will close the circuit and the current will pass over the wire *a* and through the cut-out C, the switch *c* being then in position to connect the two parts of the wire *a*, as shown. As soon as the switch *c* is shifted, as shown by dotted lines, the controllers will be cut out of the circuit, and a circuit will be formed by the wires *a b* and switch *c*, so that the current will pass through the magnet 9 of the cut-off valve H and through the indicator I and alarm D. This will sound the alarm, indicate the location of the leak, and cut off the water from the district in which the leak exists. If a leak occurs between the controller A′ and either one of the controllers B′, the result will be the same, except that the switch *c′* will be shifted so as to send the current through the wires *a* and *b′* and operate the indicator I′ and cut-off valve H′. The organizations of the apparatus thus far described are applicable to those systems of water distribution where the water-pipes of a building or district are supplied from a single source. There are many cases, however, in which the water-pipes of a building or district are supplied continuously from two sources or at different times from different sources—as, for example, from a street-main and from a tank or reservoir. In order to make the apparatus effective in such case, it is necessary to provide the pipe through which the water enters the building or district from each of these sources of supply with a primary controller.

In Fig. 11 an organization of this character suitable for a single building or district is illustrated. In this case A represents two primary controllers located in the pipes through which the water from each of the sources of supply enters the building or district, and H the two cut-off valves located adjacent to these controllers. B represents the secondary controllers located adjacent to each of the faucets through which the water is drawn. The controllers B and one of the controllers A and the magnet 9 of the cut-off valve, located adjacent to that controller, are connected by a wire *a*, which is grounded at its ends, as indicated at *g*, and provided with a battery E. This wire is connected to a cut-out apparatus C, the switch *c* of which when in its normal position, as shown, connects the two parts of the wire, the same as in the organization shown in Fig. 7. The wire *a* is provided with a branch wire *b*, leading from the wire *a* at a point between the cut-out C and the nearest of the controllers B, and terminating at a point within the range of the switch *c*. This wire *b* is connected to an alarm D, the same as in the organization shown in Fig. 7. The wire $a$ is also provided with a branch $d$, which is connected to the wire $a$ at a point near the primary controller A to which the wire $a$ is connected. This wire $d$ is grounded at its end, as indicated at $g$, and is connected to the other of the primary controllers A, and also to the magnet 9 of the cut-off valve located adjacent to that controller.

Let it be assumed that a faucet adjacent to one of the controllers B is opened at a time when the building or district is being supplied through the pipe in which the controller A which is connected to the wire $a$ is located. The controller A will at once be operated to close the circuit at that point, as already explained, and at the same time, or shortly after, the controller B, adjacent to the faucet which is opened, will be operated so as to break the circuit at that point, and as a consequence the current will not pass over the wire $a$. As before explained, however, it may happen that the primary controller may operate slightly in advance of the secondary controllers, thus allowing the current to pass over the wire $a$ and through the cut-out for a very short period of time. The cut-out will, however, as before explained, be so adjusted that the switch $c$ will not be shifted before the controller B has had time to operate and break the circuit. The magnet 9 of the cut-off valve H being, however, in this case connected to the wire $a$, the current will during this short period of time pass through the magnet, and thus, if means were not provided for preventing it, the magnet 9 might be energized sufficiently to release the valve H, and thus cut off the supply of water. To avoid this, the wire $a$ is provided with a suitable resistance-coil R, which so weakens the current that it is not of sufficient strength to fully energize the magnet 9. The result will be the same if a faucet adjacent to one of the controllers B is opened at a time when the building is being supplied through the pipe in which the controller A which is connected to the wire $d$ is located, except that in such case the current will pass over the wires $a\ d$ and through the magnet 9, which is connected to the wire $d$. The result will also be the same if the faucet adjacent to one of the controllers B is opened at a time when the building is being supplied from both sources of supply, except that in that case the current will be divided and will pass over the two circuits formed by the wire $a$ and the wires $a\ d$.

Let it now be assumed that a leak occurs at any point in the building or district at a time when the building is being supplied through the pipe in which the controller A that is connected to the wire $a$ is located. The controller A will at once be operated so as to close the circuit at that point in the manner already explained, and the current will then pass over the wire $a$ and through the cut-out C, thereby shifting the switch $c$ to the position shown by dotted lines. During this time the current will be so weakened by the resistance-coil R that the magnet 9, connected to the wire $a$, will not be energized so as to operate the cut-out valve. As soon, however, as the switch $c$ is shifted the full current will pass over the wires $a\ b$, thereby operating the alarm D and energizing the magnet 9 so as to operate the cut-off valve. The result will be the same if a leak occurs at a time when the building is being supplied through the pipe in which the controller A which is connected with the wire $d$ is located, except that in that case the current will pass over the wires $a\ b\ d$. The result will also be the same if a leak occurs at a time when the building is being supplied from both sources, except that in that case the current will pass over the two circuits formed by the wires $a\ b$ and the wires $a\ b\ d$, thereby operating the alarm and also operating both the cut-off valves.

It is be remarked that in the organization just described the alarm D, instead of being connected to the wire $b$, may be connected to the wire $a$, as indicated by dotted lines. In such case the resistance R will so weaken the current passing over the wire $a$ that the alarm will not be operated until after the switch $c$ has been shifted so as to cut out the resistance R.

In some cases it may not be desired to provide the apparatus with the automatic cut-off valves, and in such case if the alarm D is connected to the wire $b$ the wire $b$ may be grounded, as indicated by dotted lines, instead of being connected to the wire $a$. When the apparatus is thus organized, the current will of course cease to pass over the wires $a\ d$ as soon as the switch $c$ is shifted. In some cases the wire $d$ may be arranged to form a loop connected at both ends to the wire $a$, as indicated by dotted lines.

The organization illustrated in Fig. 12 is substantially the same as that just described, except that provision is made for dividing the system of pipes to which the apparatus is applied into districts, so that, in addition to giving an alarm and cutting off the supply of water to the whole system whenever a leak occurs, the location of the leak is indicated. To accomplish this, the connections are arranged the same as in Fig. 8, except that the wire $a$ is provided with the resistance R. The magnet 9 of the valve H, for controlling one of the supply-pipes, is connected to the wire $a$ between the controller A and the ground. The wire $a'$, instead of being grounded, is connected to the wire $a$ between the controller A and the valve H. The wire $a$ is provided with a branch wire $d$, which is grounded, and is connected to the magnet 9 of the valve H, for controlling the other supply-pipe, and to the second primary controller A of the first district, and the wire $a'$ is provided with a branch $d'$, which is joined to the wire $d$ between the valve H and the controller A, and is connected to the second primary controller A' of the second district. The operation of the apparatus when thus organized is substantially the same as has already been described in connection with Figs. 8 and 11.

Whenever a leak occurs in either one of the districts—say, for example, the district in which the controllers A B are located—one or both of the controllers A will be operated to close the circuit through that district, as already explained. The current will then pass over the wire $a$ and to the ground. The magnet or magnets 9 will not, however, owing to the resistance R, be energized so as to operate the cut-off valve or valves, but the switch $c$ will be shifted, the same as shown in Fig. 8. The current will then pass over the wires $a$ $n$ $b$, thereby operating the alarm D and the indicator I, so as to indicate the district in which the leak exists, and at the same time one or both of the magnets 9 will be energized, so as to cut off the supply of water from the whole system. The result will be the same if the leak occurs in the district in which the controllers A′ B′ are located, except that in this case the circuit will be closed through the wire $a'$ to shift the switch $c$, and after the switch is shifted the current will pass over the wire $b'$ and operate the indicator I′.

It is to be remarked that the results just described may be secured in the organization shown in this figure if the portions of the wires $a$ $a'$ which extend from the points indicated by + are omitted and the wire $a$ extended, as indicated by dotted lines, so as to unite with the wire $b$ between the switch and the alarm. In that case the current will always pass through the alarm and the indicators; but it will be so weakened by the resistance R that it will not operate these mechanisms until after the switch $c$ has been shifted so as to cut out the resistance.

The organization illustrated in Fig. 13 is applicable to a system of water distribution which is divided into districts, each district being supplied from two sources. The operation of the apparatus in connection with each district is the same as has already been described in connection with Figs. 11 and 12. When a leak occurs in a district in which the controllers A B are located, the circuit will be closed through the wire $a$, so as to shift the switch $c$, after which the current will pass over the wire $b$, so as to operate the alarm and the indicator I and close the cut-off valve or valves H, so as to shut off the supply of water to that district. If the leak occurs in the district in which the controllers A′ B′ are located, the result will be the same, except that the circuit will be closed through the wire $a'$ to shift the switch, and after the switch is shifted the current will pass over the wire $b'$, so as to operate the indicator I′ and the cut-off valve or valves H′, so as to shut off the supply of water to that district.

The organization illustrated in Fig. 14 secures the same results as that last described. In this case, however, each district is provided with a cut-out mechanism, the same as in Fig. 10, the wire $a$ being connected to the switches $c$ $c'$ of these two mechanisms. If a leak occurs in the district in which the controllers A B are located the circuit will be closed through the wire $a$, so as to shift the switch $c$. As soon as the switch $c$ is shifted the resistance R will be cut out of the circuit and the two parts of the wire $b$ will be connected by the switch $c$, so that the current will pass over the wire $b$ through the indicator I and alarm D and thence to the ground, as indicated at $g$. At the same time that this takes place a portion of the current will pass over the wires $b$ $a$ or $b$ $a$ $d$, or both, so as to energize the magnet or magnets 9 and operate the cut-off valve or valves H. Inasmuch as the resistance offered by the indicator and alarm mechanisms will in practice be much less than that offered by the magnet or magnets 9, it will be necessary to provide the wire $b$ with a suitable resistance-coil R′, so as to compel a sufficient part of the current to pass through the magnets 9 to properly energize them. If a leak occurs in the district in which the controllers A′ B′ are located, the result will be the same, except that the circuit will be formed through the wire $a'$ to shift the switch $c'$, and after the switch has been shifted the current will pass over the wire $b'$ and through the indicator I′, so as to operate that indicator and the cut-off valve or valves H′. In the organizations herein shown connections are illustrated for applying the apparatus to systems which are divided into only two districts. It will readily be seen, however, that by carrying out the principle herein illustrated the apparatus can be applied to systems which are divided into any number of districts.

Although it will usually be preferable to make provision, as herein illustrated, for automatically cutting off the supply of water either from the whole system or from a single district whenever a leak occurs, there may be cases in which it will not be necessary or desirable to make such provision, and in such cases the cut-off valve or valves may be omitted without departing from the essential features of the invention. So, also, it may in some cases be desirable to dispense with the indicator mechanism, and this mechanism can also be omitted without departing from the invention, or the indicator may be used without the alarm.

In the foregoing description of the different organizations of the apparatus it has been assumed that the water is drawn from the pipes only by means of faucets. In some cases, however, the water is drawn from the supply-pipe by other means, as by a pump, which takes water out of the pipe and forces it to an elevated tank. In any such case it will, of course, be necessary to have one of the secondary controllers located adjacent to the exit, where the water is discharged the same as at each of the faucets. The primary controller will then be operated to close the circuit as the water is withdrawn from the pipe; but the discharge of the water will operate the secondary controller to break the circuit, the same as hereinbefore described, so that no alarm will be given. If the pump in such case should be single-acting, the primary controller might be operated on the suction-stroke to close the circuit, while the secondary controllers would not be operated to break the circuit until the force stroke; but the cut-out apparatus would in such case prevent the alarm from being sounded.

There are other cases in which the primary controller may be operated in advance of the secondary controller—as, for example, when air accumulates in the pipes and the pressure from the source of supply is increased. In such case the water will temporarily flow past the primary controller and cause it to close the circuit; but in all such cases the cut-out apparatus will prevent the alarm from being given.

The form of cut-off valve herein illustrated and described has been selected merely for the purpose of showing a suitable form of valve for that purpose. Other forms of valve may be used, if preferred, without departing from the invention. The provision for opening a waste-passage to allow the water to flow out of the pipe when the cut-off valve is closed may of course be omitted, or a separate cock or valve operated by an independent magnet may be employed.

The primary controller or controllers must of course be arranged to be operated by the movement of the water in the pipe or pipes occasioned by a change of pressure due to the withdrawal of the water either through a faucet or other outlet, or through a leak, and it will usually be found most desirable to have the secondary controllers operated in the same manner; but the secondary controllers may be arranged so that instead of being operated by the water to break the circuit they will be so operated by the act of opening the faucets, the circuit making and breaking devices being connected to the moving part of the faucet. Figs. 15 and 16 illustrate an arrangement of this character. In this case the plug $y$ of the cock G is provided with an arm carrying an insulated contact-plate 5, to which one of the wires $a$ is connected, while the shell of the cock is provided with a similar arm carrying another insulated contact-plate 5, to which the other wire $a$ is connected. These arms and contact-plates are so arranged that when the cock is closed the two contact-plates 5 will be together, and the circuit will be closed at that point, so that upon the operation of the primary controller the alarm will be given. As soon, however, as the cock is opened the contact-plates 5 will be separated, so as to break the circuit at that point, and as a consequence the operation of the primary controller will not give the alarm. The form and arrangement of the primary controllers which are illustrated are those which are considered the best adapted for the purpose; but it may be modified without departing essentially from the invention. In fact, the controllers may be of any suitable form or construction so long as they will be affected by the pressure or flow of the water in such manner as to change the condition of the electric circuits to operate the translating device.

From the foregoing it will be seen that the invention in all of its forms consists, essentially, of a primary controller operated by the water when it is set in motion in the pipe, and having electrical connections by which, when thus operated, it operates some form of translating device to give notice of the fact that the water is moving in the pipe, and a secondary controller operated when water is drawn from the pipe in the regular way, and electrical connections by which when thus operated it neutralizes the effect of the primary controller and prevents the operation of the translating device. The primary and secondary controllers as thus connected may be termed "reversely-arranged controllers," and wherever this term is used in the claims I mean controllers so arranged that the secondary controller when operated opposes and neutralizes the action of the primary controller, preventing the latter when operated from having its normal effect. The organizations of the apparatus for accomplishing this result which have been illustrated are deemed the best for the purpose; but the form and arrangement of the electrical connections may be widely varied from those shown without in anywise departing from the essential features of the invention.

What I claim is—

1. The combination, with a water-pipe, of a translating device located in an electric circuit, reversely-arranged primary and secondary controllers located, respectively, distant from and adjacent to the exit of such pipe and operated on the flow of water near them, and connections between said controllers and the circuit, whereby the operation of said primary controller operates the translating device and the operation of said secondary controller neutralizes the effect of the primary controller and prevents the operation of the translating device, substantially as described.

2. The combination, with a water-pipe, of a translating device located in an electric circuit, reversely-arranged primary and secondary controllers located, respectively, distant from and adjacent to each exit of such pipe and operated on the flow of water near them, and connections between said controllers and the circuit, whereby the operation of said primary controller operates the translating device and the operation of said secondary controller neutralizes the effect of the primary controller and prevents the operation of the translating device, substantially as described.

3. The combination, with a water-pipe, of a translating device located in an electric circuit, reversely-arranged primary and secondary controllers located, respectively, distant from and adjacent to the exit of such pipe and operated by the water when in motion near them, and connections between said controllers and the circuit, whereby the operation of said primary controller operates the translating device and the operation of said secondary controller neutralizes the effect of the primary controller and prevents the operation of the translating device, substantially as described.

4. The combination, with a water-pipe, of a translating device located in an electric circuit, reversely-arranged primary and secondary controllers located, respectively, distant from and adjacent to each exit of such pipe and operated by the water when in motion near them, and connections between said controllers and the circuit, whereby the operation of said primary controller operates the translating device and the operation of said secondary controllers neutralizes the effect of the primary controller and prevents the operation of the translating device, substantially as described.

5. The combination, with a water-pipe, of a translating device located in an electric circuit, an automatic cut-out apparatus also in said circuit, reversely-arranged primary and secondary controllers located, respectively, distant from and adjacent to the exit of such pipe and operated on the flow of water near them, and connections between said controllers and the circuit, whereby the operation of said primary controller changes the condition of said circuit and thereby operates the cut-out apparatus, and the operation of said secondary controller neutralizes the effect of said primary controller and prevents the operation of the cut-out apparatus, substantially as described.

6. The combination, with a water-pipe having a cut-off valve or cock, of an electric circuit containing an electro-magnet for controlling said cut-off valve, reversely-arranged primary and secondary controllers located, respectively, distant from and adjacent to the exit of such pipe and operated on the flow of water near them, and connections between said controllers and the circuit, whereby the operation of said primary controller changes the condition of the circuit to close said cut-off valve and the operation of said secondary controller neutralizes the effect of said primary controller to prevent said valve from closing, substantially as described.

7. The combination, with a primary and secondary controllers A B and A' B', located in different districts, of the wires $a a'$, cut-out apparatus C, wires $b b'$, and indicators I I', substantially as described.

8. The combination, with primary and secondary controllers A B and A' B', located in different districts, of the wires $a a'$, cut-out C, wires $b b'$, cut-off valve H, and indicators I I', substantially as described.

9. The combination, with primary and secondary controllers A B and A' B', located in different districts, of the wires $a a'$, cut-out C, wires $b b'$, cut-off valves H H', and indicators I I', substantially as described.

10. The combination, with primary and secondary controllers A B and A' B', located in different districts, of the wires $a a'$, cut-outs C C', wires $b b'$, cut-off valves H H', and indicators I I', substantially as described.

11. The combination, with primary controllers A, located in different supply-pipes to the same system, and a secondary controller or controllers B, of the wires $a d$, forming circuits through each of the primary controllers and the secondary controller or controllers, substantially as described.

12. The combination, with primary controllers A, located in different supply-pipes to the same system, and a secondary controller or controllers B, of the wires $a d$, forming circuits through each of the primary controllers and the secondary controller or controllers, and the cut-off valves H, arranged in the supply-pipes and connected to the wires $a d$, substantially as described.

In testimony whereof I have hereunto set my hand in the presence of two subscribing witnesses.

WILLIAM WOODWARD ROSENFIELD.

Witnesses:
J. A. HOVEY,
JAS. J. KENNEDY.